United States Patent [19]

Moriyama

[11] Patent Number: 4,986,643
[45] Date of Patent: Jan. 22, 1991

[54] LENS SYSTEM CAPABLE OF CLOSE-UP PHOTOGRAPHING

[75] Inventor: Keiji Moriyama, Yokohama, Japan

[73] Assignee: Nikon Corporation, Tokyo, Japan

[21] Appl. No.: 374,866

[22] Filed: Jul. 3, 1989

[30] Foreign Application Priority Data

Jul. 8, 1988 [JP] Japan .................. 63-170118

[51] Int. Cl.$^5$ .............................. G02B 9/12
[52] U.S. Cl. .................. 350/477; 350/428
[58] Field of Search .............. 350/477, 430, 428

[56] References Cited

U.S. PATENT DOCUMENTS 4,786,153 11/1988 Ogata .................. 350/428

FOREIGN PATENT DOCUMENTS 62-227111 10/1987 Japan .

Primary Examiner—Paul M. Dzierzynski
Attorney, Agent, or Firm—Shapiro and Shapiro

[57] ABSTRACT

A lens system capable of close-up photographing comprises, in succession from the object side, a first lens group having a positive refractive power, a second lens group having a positive refractive power, and a third lens group having a negative refractive power. The first lens group and the second lens group are moved relative from each other for focusing to infinity to a close distance so that the spacing between the first lens group and the second lens group is reduced and the spacing between the second lens group and the third lens group is enlarged. The first and second lens groups are designed to satisfy the following condition:

$$1.0 < \Delta S_2 / \Delta S_1 < 1.4,$$

where $\Delta S_1$ is the amount of movement of the first lens group from the infinity photographing condition to a state in which an object at any distance is photographed, and $\Delta S_2$ is the amount of movement of the second lens group from the infinity photographing condition to a state in which an object at any distance is photographed.

16 Claims, 6 Drawing Sheets

LENS SYSTEM CAPABLE OF CLOSE-UP PHOTOGRAPHING

BACKGROUND OF THE INVENTION

1. Field of the Invention

This invention relates to an objective lens for photographing, and in particular to an objective lens capable of short distance (close-up) photographing which has a high performance in all photographing ranges from an infinity object to a short distance object for which the photographing magnification is one-to-one magnification.

2. Related Background Art

As an objective lens system of this type, there is known an objective lens of three-group construction having, in succession from the object side, a first lens group having a positive refractive power, a second lens group having a positive refractive power, and a third lens group disposed rearwardly of the second lens group and having a negative refractive power and functioning as a rear converter. In the focusing system from infinity photographing to one-to-one magnification photographing, there have heretofore been proposed various focusing systems such as a system in which the first lens group and the second lens group are axially moved together toward the object side, and a system in which the spacing between the first lens group and the second lens group is enlarged while the first lens group and the second lens group are axially moved toward the object side.

However, these focusing systems have suffered from the disadvantage that the amount of movement of the first lens group becomes great and the variation in the full length from infinity photographing to one-to-one magnification photographing is great. As an objective lens system for overcoming such disadvantage, the system disclosed, for example, in Japanese Laid-Open Patent Application No. 62-22711 is already known. In this publication, use is made of a system whereby during the focusing from infinity photographing to one-to-one magnification photographing, the first lens group and the second lens group as previously described are moved together toward the object side and the magnification of the third lens group is made great to thereby make the amount of movement during short distance focusing small and make the variation in the full length of the lens system small.

However, in the lens system disclosed in this publication, the magnification of the negative third lens group is basically made great and therefore, the negative refractive power of this third lens group must be strengthened and therefore, the balance of Petzval sum is lost and becomes excessively negative, and correction of curvature of image field, astigmatism, etc. becomes difficult, and this is not preferable.

Also, it is unavoidable to strengthen the positive refractive power of the composite lens system provided by the first and second lens groups, and spherical aberration occurs greatly over the infinity photographing condition to the close distance photographing condition, and this leads to the problem that the lens performance is remarkably deteriorated.

SUMMARY OF THE INVENTION

Accordingly, it is an object of the present invention to solve the above-noted problems peculiar to the prior art and to provide an objective lens system which has an excellent imaging performance, with various aberrations including spherical aberration being sufficiently corrected over infinity photographing to close distance photographing, and moreover which has a small amount of variation in the full length and which is compact and improved in operability as well as capable of short distance photographing.

To achieve the above object, the present invention has, in succession from the object side, a first lens group having a positive refractive power, a second lens group having a positive refractive power, and a third lens group having a negative refractive power, and when focusing from infinity to a close distance is effected, the spacing between said second lens group and said third lens group is enlarged while the spacing between said first lens group and said second lens group is reduced so as to satisfy the following condition:

$$1.0 < \Delta S_2/\Delta S_1 < 1.4,$$

where $\Delta S_1$ is the amount of movement of the first lens group from the infinity photographing condition to a state in which an object at any distance is photographed, and $\Delta S_2$ is the amount of movement of the second lens group from the infinity photographing condition.

To correct aberrations well while making the amount of movement of each lens group during close distance focusing small, it is desirable to satisfy the following condition:

$$0.7 < f_{12}/f < 1.0,$$

where f is the focal length of the entire system in the infinity photographing condition, and $f_{12}$ is the combined focal length of the first lens group and the second lens group in the infinity photographing condition.

According to the present invention, the design is such that the first lens group and the second lens group are moved relative to each other to accomplish focusing, and a lens can be achieved which maintains an excellent imaging performance over a range from infinity to a close distance, and yet has a small variation in the full length, and which has improved operability as well as being capable of short distance photographing of high performance.

Further objects, features and effects of the present invention will become fully apparent from the following detailed description taken in conjunction with the accompanying drawings.

DESCRIPTION OF THE PREFERRED EMBODIMENTS

Some embodiments of the present invention will hereinafter be described in detail with reference to the accompanying drawings.

Each of lens systems according to the embodiments of the present invention, as shown in FIGS. 2 to 6, comprises, in succession from the object side, a first lens group G1 having a positive refractive power, a second lens group G2 having a positive refractive power, and a third lens group G3 having a negative refractive power, and the first lens group G1 and the second lens group G2 are designed to be moved relative to each other from the infinity-focused position shown in (A) of the respective figures to the close distance-focused position shown in (B) of the respective figures, in conformity with the in-focus state.

The principle of focusing in the present invention will first be described with reference to FIGS. 1(A) and (B). In FIG. 1, to facilitate the description, the construction in the present invention is shown with the first lens group G1 and the second lens group G2 as a positive lens G12 comprised thereof (hereinafter referred to as the composite lens G12) and with the third lens group as a negative lens G3, and FIG. 1(A) shows the lens arrangement in the infinity-focused state, and FIG. 1(B) shows the lens arrangement in the close distance-focused state.

Assuming that the combined focal length of the composite lens G12 with the spacing between the first lens group G1 and the second lens group G2 being fixed is $f_{12}$ and the magnification of the third lens group G3 is $\beta_3$, the focal length f of the entire system can be expressed as $$f = f_{12} \cdot \beta_3. \tag{1}$$

Also, assuming that the magnification of the composite lens G12 is $\beta_{12}$, the photographing magnification m of the entire system can be expressed as $$m = \beta_{12} \cdot \beta_3 \ (m<0). \tag{2}$$

Figure 1:
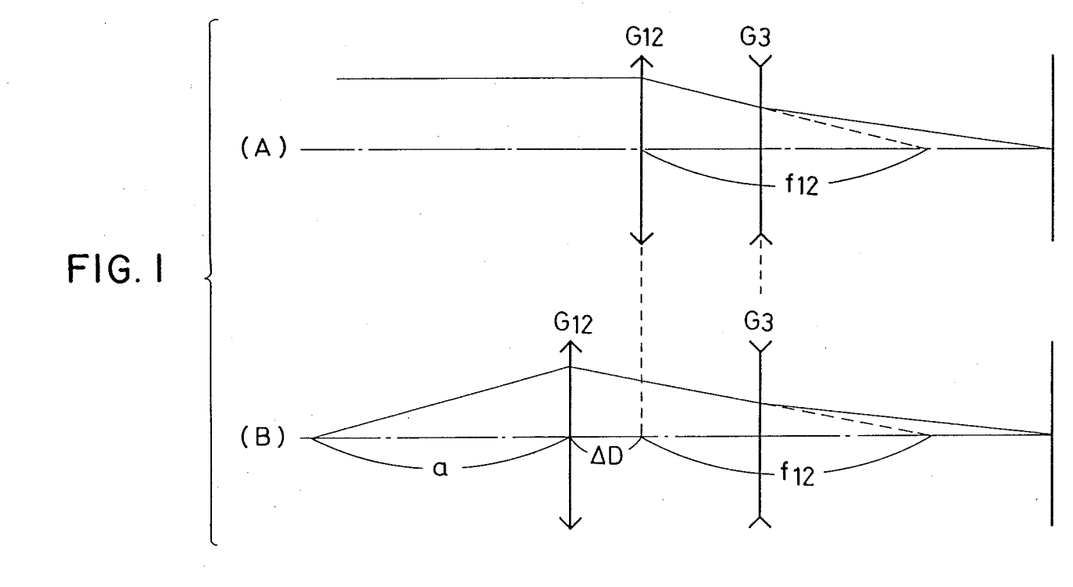
FIG. 1 is a schematic optical path illustration showing the principle of the present invention.

Also, assuming that as shown in FIG. 1(B), the distance from the principal point of the composite lens G12 to a close distance object is a and the amount of movement of the composite lens G12 from the infinity photographing condition to the close distance photographing condition is $\Delta D$, the magnification $\beta_{12}$ of the composite lens G12 can be expressed as $$\beta_{12} = -\frac{\Delta D + f_{12}}{a} \tag{3}$$

Further, from Newton's formula $(xx' = f^2)$, the following can be expressed:

$$\Delta D(a - f_{12}) = f_{12}{}^2 \tag{4}$$

and from the equations ① to ④, $$\Delta D = -m \cdot f_{12}{}^2 / f \tag{5}$$

can be found.

In the present invention, design the is such that when focusing from infinity to the close distance, the spacing between the first lens group G1 and the second lens group G2 is reduced and therefore, the focal length $f_{12}$ of the above-described composite lens G12 gradually becomes shorter. Accordingly, as can be seen from the equation ⑤, the amount of movement $\Delta D$ of the composite lens G12 becomes smaller, and it becomes possible to make the variation in the full length resulting from the close distance focusing small to the utmost.

Also, in the present invention, it becomes possible to make the used magnification (the converter magnification) of the third lens group G3 having a negative refractive power and having the function as a rear converter relatively small and therefore, the negative refractive power of the third lens group G3 can be weakened, and this is advantageous to the correction of aberrations. Accordingly, good balance of Petzval sum can be kept and moreover, the correction of curvature of image field, astigmatism, etc. becomes easy.

Further, the refractive powers of the first lens group G1 and the second lens group G2 can be made weak, and this is very advantageous also to the correction of spherical aberration.

Thus, by the present invention, there can be provided an objective lens which can minimize the amount of variation in the full length of the lens system in close distance photographing and yet can bring out an excellent imaging performance over the entire focusing area from the infinity photographing to the close distance photographing.

As described above, in the lens of the present invention, the design is such that when focusing is to be effected from the infinity to a close distance with the first lens group G1 and the second lens group G2 moved relative to each other, the spacing between the second lens group G2 and the third lens group G3 is enlarged while the spacing between the first lens group G1 and the second lens group G2 is reduced so as to satisfy the following condition (1):

$$1.0 < \Delta S_2 / \Delta S_1 < 1.4 \tag{1}$$

where $\Delta S_1$: the amount of movement of the first lens group G1 from the infinity photographing condition to a state in which an object at any distance is photographed.

$\Delta S_2$: the amount of movement of the second lens group G2 from the infinity photographing condition to a state in which an object at any distance is photographed.

Further, the above-described lens system is designed to satisfy the following condition:

$$0.7 < f_{12}/f < 1.0 \tag{2}$$

where f is the focal length of the entire system in the infinity photographing condition, and $f_{12}$ is the combined focal length of the first lens group G1 and the second lens group G2 in the infinity photographing condition.

The conditions (1) and (2) will now be described.

The condition (1) prescribes the ratio of the amounts of movement of the first lens group G1 and the second lens group G2 from the infinity-focused state to a state in which the lens is in focus to an object at any distance.

If the upper limit of the condition (1) is exceeded, the positive combined refractive power of the first lens group G1 and the second lens group G2 will become too strong in the close distance photographing condition and therefore, bending of spherical aberration in the close distance photographing condition will occur and correction of spherical aberration will become difficult. On the other hand, if the lower limit of the condition (1) is exceeded, the spacing between the first lens group G1 and the second lens group G2 will become constant or enlarged during infinity to close distance focusing and therefore, the variation in the full length during focusing will become great and it will become basically impossible to accomplish a reduction in the amount of movement of the first lens group G1.

The condition (2) prescribes the ratio of the combined focal length $f_{12}$ of the first lens group G1 and the second lens group G2 in the infinity photographing condition to the focal length f of the entire system in the infinity photographing condition.

If the upper limit of the condition (2) is exceeded, the amounts of axial movement of the first lens group G1 and the second lens group G2 will become too great and therefore, even if the spacing between the first lens group G1 and the second lens group G2 is reduced during close distance photographing while these two lens groups are axially moved toward the object side, it will be impossible to achieve a reduction in the amount of movement as a whole, and this is not preferable. On the other hand, if the lower limit of the condition (2) is exceeded, the used magnification of the negative third lens group G3 will become greater and the negative refractive power in the third lens group G3 will strengthen and therefore, Petzval sum will become excessively negative and correction of curvature of image field, astigmatism, etc. will become difficult. Further, the positive combined refractive power of the first lens group G1 and the second lens group G2 will strengthen and therefore, spherical aberration will occur enormously and correction thereof will become difficult.

Also, to achieve sufficient aberration correction over the range from infinity to a close distance, it is desirable that the present invention be designed to satisfy the following conditions:

$$1.8 < f_1/f_{12} < 2.6 \quad (3)$$

$$1.7 < f_1/f_2 < 2.7 \quad (4)$$

where
$f_1$: the focal length of the first lens group G1.
$f_2$: the focal length of the second lens group G2.

The condition (3) prescribes an appropriate ratio of the focal length $f_1$ of the first lens group G1 to the combined focal length $f_{12}$ of the first and second lens groups G1 and G2.

If the upper limit of the condition (3) is exceeded, the burden of the refractive power of the second lens group G2 will become relatively too strong and therefore, spherical aberration in the close distance photographing condition will occur greatly and correction thereof will become difficult. On the other hand, if the lower limit of the condition (3) is exceeded, the refractive power of the first lens group G1 will become too strong and therefore, the fluctuations of spherical aberration in the infinity photographing condition and the close distance photographing condition will become remarkable. Also, the principal point of the composite lens G12 in the infinity photographing condition will become too near to the object side and therefore, the second lens group G2 will mechanically interfere with the third lens group G3 in the infinity photographing condition, and this is not preferable. Therefore, an attempt to secure the spacing between the second lens group G2 and the third lens group G3 sufficiently will lead to the necessity of making the used magnification of the third lens group G3 rather large and as a result, the lower limit of the aforedescribed condition (2) will be exceeded and it will become impossible to achieve the objects of the present invention.

The condition (4) prescribes an appropriate ratio of the focal length $f_1$ of the first lens group G1 to the focal length $f_2$ of the second lens group G2.

If the upper limit of the condition (4) is exceeded, good aberration correction will be possible in the infinity photographing condition, but various aberrations will occur remarkably in the close distance photographing condition and correction thereof will become difficult. On the other hand, if the lower limit of the condition (4) is exceeded, the focal length $f_2$ of the second lens group G2 will become great, and even if during close distance focusing, the spacing between the first lens group G1 and the second lens group G2 is reduced while these two lens groups are axially moved toward the object side, the variation in the combined focal length $f_{12}$ of these two lens groups will become small. Therefore, the amount of movement as a whole will become great and as a result, the effect of the present invention cannot be obtained sufficiently. Also, the refractive power of the first lens group G1 will become too strong and therefore, the amounts of various aberrations occurring in the first lens group G1 will increase, and this is not preferable.

Embodiments of the present invention shown in the accompanying drawings will now be described.

FIGS. 2 to 6 show the lens constructions of first to fifth embodiments of the present invention, respectively. In these figures, (A) shows the lens arrangement in the infinity photographing condition, and (B) shows the lens arrangement in the close distance photographing condition.

Each embodiment is an objective lens capable of short distance photographing which has a focal length of 105 mm and can secure brightness of the order of F-number 2.8. Also, all these embodiments are of basically similar lens constructions, and the constructions of the respective lens groups comprise are as follows in succession from the object side.

The first lens group G1 having a positive refractive power has a positive lens L1 having its surface of sharper curvature facing the object side, a positive meniscus lens L2 having its convex surface facing the object side, and a negative meniscus lens L3 having its concave surface facing the image side, and the second lens group G2 having a positive refractive power has a negative lens L4 having its concave surface of sharp curvature facing the object side, a positive lens L5 joined to the negative lens L4, and a positive lens L6 having its surface of sharper curvature facing the image side. The third lens group G3 having a negative refractive power has a positive meniscus lens L7 having its convex surface facing the image side, a negative lens L8, and a positive lens L9 having its surface of sharper curvature facing the object side.

In the above-described construction, it is desirable to further satisfy the following conditions:

$$-1 < q < -0.7 \quad (5)$$

$$0.7 < f_3(\phi_A + \phi_B) < 0.9 \quad (6)$$

where q: the shape factor of the positive lens in the second lens group G2.

$$q = \frac{r_b + r_a}{r_b - r_a}$$

$r_a$: the radius of curvature in the object side surface of the positive lens L6 in the second lens group G2.
$r_b$: the radius of curvature in the image side surface of the positive lens L6 in the second lens group G2.
$f_3$: the focal length of the third lens group G3.
$\phi_A$: the surface refractive power in the image side surface of the positive lens L7 in the third lens group G3.
$\phi_B$: the surface refractive power in the object side surface of the negative lens L8 in the third lens group G3.

$$\phi_A = \frac{1 - n_c}{r_c}$$

$$\phi_B = \frac{n_d - 1}{r_d}$$

$r_c$: the radius of curvature in the image side surface of the positive lens L7 in the third lens group G3.
$n_c$: the refractive index in the positive lens L7 in the third lens group G3.
$r_d$: the radius of curvature in the object side surface of the negative lens L8 in the third lens group G3.
$n_d$: the refractive index in the negative lens L8 in the third lens group G3.

The condition (5) prescribes an appropriate lens shape for correcting aberrations well. If the upper limit of the condition (5) is exceeded, positive spherical aberration will occur remarkably and therefore, correction thereof will become difficult. On the other hand, if the lower limit of the condition (5) is exceeded, negative spherical aberration will occur remarkably and therefore, correction thereof will become difficult.

The condition (6) prescribes the optimum composite surface refractive power with respect to the image side surface of the positive lens L7 and the object side surface of the negative lens L8. If the upper limit of the condition (6) is exceeded, negative spherical aberration will occur remarkably in the infinity photographing condition and the fluctuation of spherical aberration in the infinity photographing condition and the close distance photographing condition will increase and correction thereof will become difficult. On the other hand, if the lower limit of the condition (6) is exceeded, positive spherical aberration will occur remarkably in the infinity photographing condition and therefore, the fluctuation of spherical aberration will likewise become great and correction thereof will become difficult.

Figure 2:
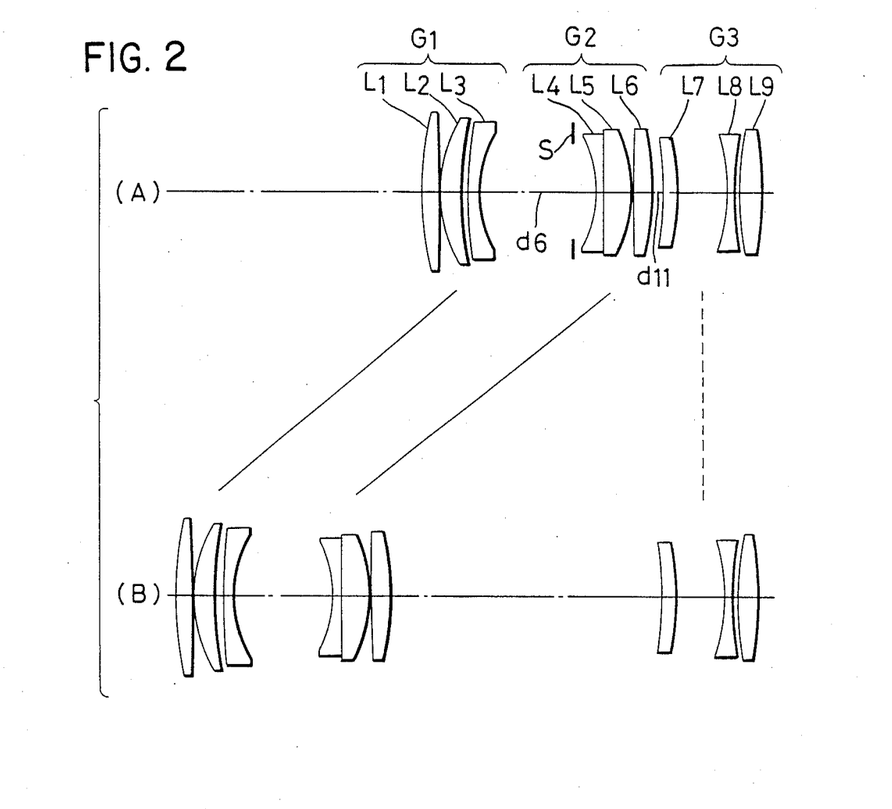
FIG. 2 is a cross-sectional view showing the construction of a lens according to a first embodiment of the present invention and the state of movement of the lens in the case of close distance focusing.
Figure 3:
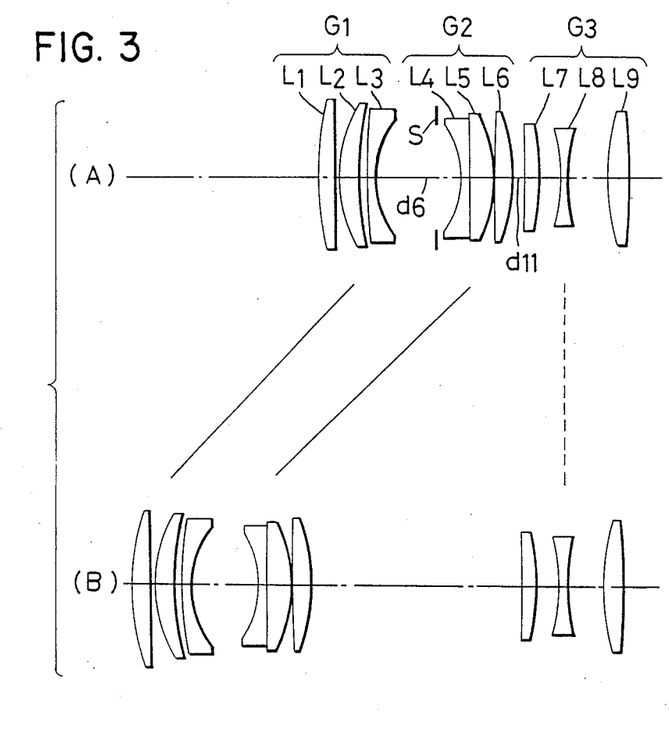
FIG. 3 is a cross-sectional view showing the construction of a lens according to a second embodiment of the present invention and the state of movement of the lens in the case of close distance focusing.
Figure 4:
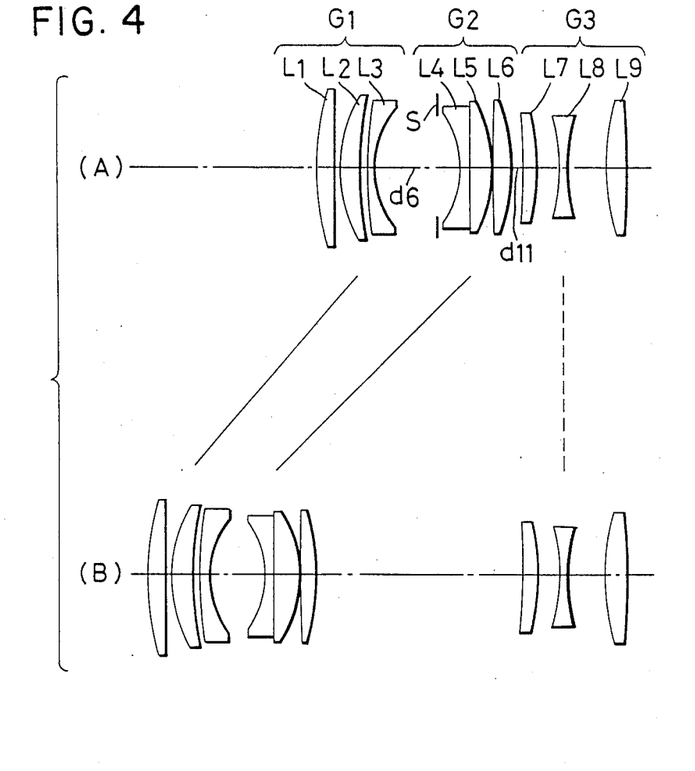
FIG. 4 is a cross-sectional view showing the construction of a lens according to a third embodiment of the present invention and the state of movement of the lens in the case of close distance focusing.
Figure 5:
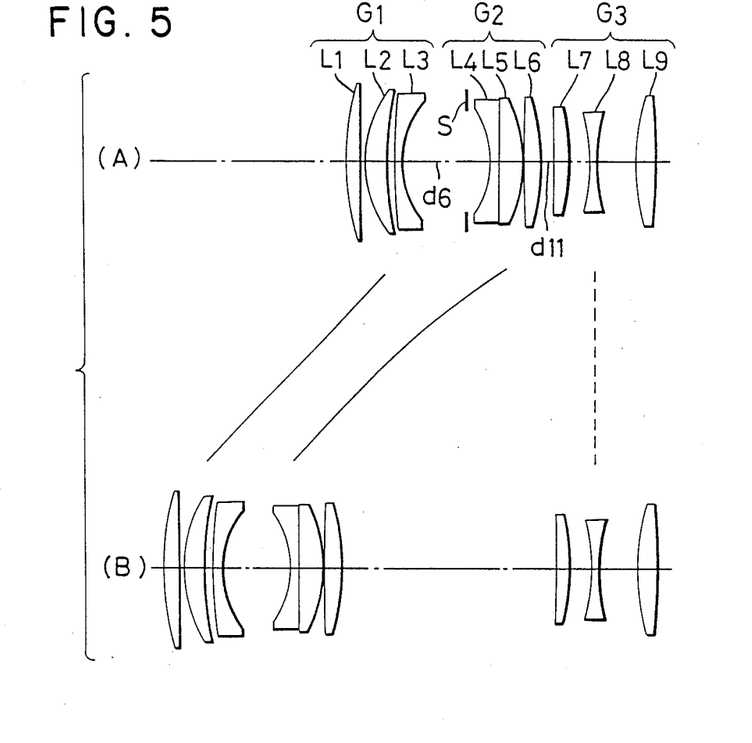
FIG. 5 is a cross-sectional view showing the construction of a lens according to a fourth embodiment of the present invention and the state of movement of the lens in the case of close distance focusing.

In the first to third embodiments shown in FIGS. 2 to 4, during the focusing from infinity to a close distance, the first and second lens groups G1 and G2 are moved toward the object side at different speeds so that the spacing between the first lens group G1 and the second lens group G2 is reduced. The second lens group G2 is moved linearly relative to the movement of the first lens group G1. Also, in the fourth embodiment shown in FIG. 5, the design is such that the second lens group G2 is moved non-linearly toward the object side relative to the linear movement of the first lens group G1 toward the object side so that the spacing between the first lens group G1 and the second lens group G2 is reduced.

Figure 6:
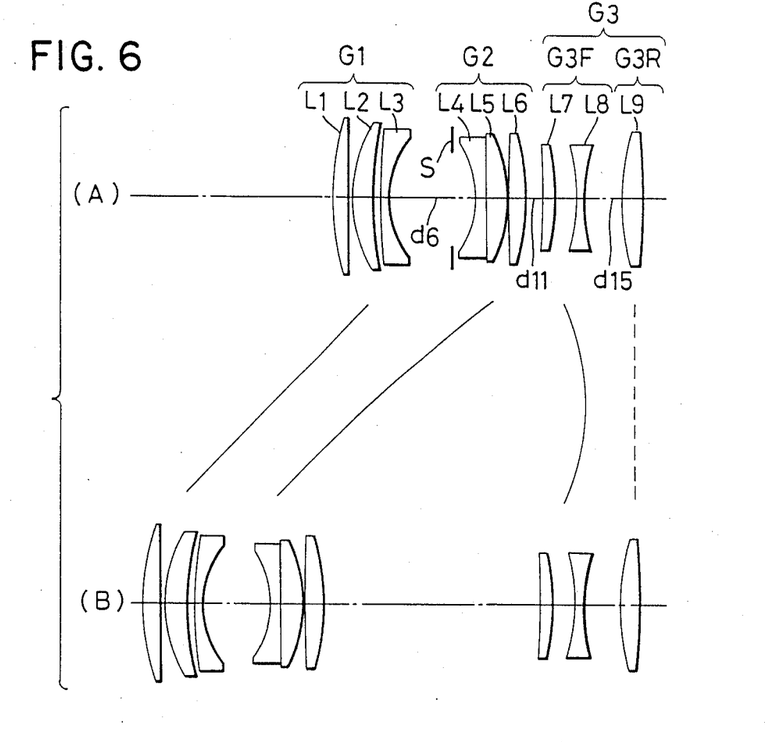
FIG. 6 is a cross-sectional view showing the construction of a lens according to a fifth embodiment of the present invention and the state of movement of the lens in the case of close distance focusing.

Also, in the fifth embodiment shown in FIG. 6, during the focusing from infinity to a close distance, the second lens group G2 is moved non-linearly toward the object side relative to the movement of the first lens group G1 toward the object side so that the spacing between the first lens group G1 and the second lens group G2 is reduced. Further, the third lens group G3 is divided into a forward group $G_{3F}$ comprising a positive lens L7 and a negative lens L8 and having a negative refractive power and a rearward group $G_{3R}$ comprising a positive lens L9 and having a positive refractive power, and during the focusing from the infinity condition shown in FIG. 6(A) to the close distance condition shown in FIG. 6(B), the forward group $G_{3F}$ is moved toward the image side so as to depict convexity to thereby correct the fluctuation of aberrations by the close distance focusing better.

In this fifth embodiment, to correct the fluctuation of the image plane effectively while minimizing the distortion resulting from the lens movement of the forward group during close distance focusing, it is desirable to satisfy the following conditions:

$$0.2 < f_{3F}/f_3 < 0.3 \quad (7)$$

$$0.8 < f_3'/f_3 < 1.3 \quad (8)$$

where $f_{3F}$: the focal length of the forward group $G_{3F}$.
$f_3$: the focal length of the third lens group G3 (the combined focal length of the forward group $G_{3F}$ and the rearward group $G_{3R}$).
$f_3'$: the focal length of the third lens group when the forward group $G_{3F}$ is moved at a maximum by the close distance photographing.

The condition (7) prescribes an appropriate ratio of the focal length of the forward group $G_{3F}$ to the focal length of the third lens group G3. If the upper limit of the condition (7) is exceeded, positive distortion will occur greatly, and if the lower limit of the condition (7) is exceeded, negative distortion will occur greatly, and this is not preferable.

Also, the condition (8) prescribes an appropriate amount of floating in the forward group $G_{3F}$. If the upper limit of the condition (8) is exceeded, the image plane will move greatly in the positive direction and moreover, negative distortion will occur greatly, and if the lower limit of the condition (8) is exceeded, positive distortion will occur greatly, and this is not preferable.

The numerical values of the respective embodiments will be shown in Tables 1 to 5 below. In each table, the numbers at the left end represent the order from the object side, r represents the radius of curvature of each lens surface, d represents the spacing between adjacent surfaces, and the refractive index n and the Abbe number $\nu$ are values for d-line ($\lambda = 587.6$ nm). Also, f represents the focal length of the entire system, FN represents F-number, $\beta$ represents the photographing magnification, D0 represents the distance from the vertex of the object side surface (the first surface) of the foremost lens to the object, and Bf represents the back focal length to the focal plane.

The numerical values of the respective embodiments for the above-described conditions (1) to (8) will be shown in Table 6 below.

TABLE 1
(First Embodiment)

FN = 2.86    Angle of view 2ω = 23.1°

|   | r | d | ν | n |
|---|---|---|---|---|
| 1 | 89.135 | 4.30 | 55.6 | 1.69680 |
| 2 | −825.458 | 0.20 | | |
| 3 | 34.325 | 6.00 | 55.6 | 1.69680 |
| 4 | 84.778 | 2.00 | | |
| 5 | 177.749 | 2.00 | 35.7 | 1.62588 |
| 6 | 26.811 | (variable) | | |
| 7 | −30.223 | 2.00 | 33.7 | 1.64831 |
| 8 | −2217.934 | 7.50 | 53.7 | 1.69350 |
| 9 | −38.620 | 0.20 | | |
| 10 | 637.422 | 4.30 | 50.2 | 1.72000 |
| 11 | −68.917 | (variable) | | |
| 12 | −91.534 | 3.50 | 25.5 | 1.80458 |
| 13 | −57.798 | 13.03 | | |
| 14 | −43.991 | 2.00 | 40.9 | 1.79631 |
| 15 | 79.429 | 1.50 | | |
| 16 | 80.085 | 4.50 | 49.5 | 1.74443 |
| 17 | −111.511 | (B f) | | |

| | f = 105.000 | β = −0.500 | β = −1.000 |
|---|---|---|---|
| D0 | ∞ | 246.632 | 143.209 |
| d 6 | 29.603 | 27.918 | 26.262 |
| d11 | 3.331 | 37.033 | 70.146 |
| B f | 42.154 | 42.154 | 42.154 |

TABLE 2
(Second Embodiment)

FN = 2.86    Angle of view 2ω = 23.3°

|   | r | d | ν | n |
|---|---|---|---|---|
| 1 | 64.416 | 4.20 | 53.7 | 1.69350 |
| 2 | 2294.143 | 1.20 | | |
| 3 | 31.593 | 5.40 | 48.1 | 1.71700 |
| 4 | 69.640 | 1.80 | | |
| 5 | 107.780 | 1.80 | 32.2 | 1.67270 |
| 6 | 23.700 | (variable) | | |
| 7 | −24.934 | 1.80 | 35.7 | 1.62588 |
| 8 | 3962.000 | 6.60 | 53.7 | 1.69350 |
| 9 | −36.905 | 0.20 | | |
| 10 | 656.083 | 4.20 | 53.7 | 1.69350 |
| 11 | −50.026 | (variable) | | |
| 12 | −418.453 | 3.60 | 25.5 | 1.80458 |
| 13 | −62.218 | 6.10 | | |
| 14 | −46.492 | 1.50 | 39.6 | 1.80454 |
| 15 | 52.110 | 10.05 | | |
| 16 | 55.591 | 5.30 | 64.1 | 1.51680 |
| 17 | −157.000 | (B f) | | |

| | f = 104.999 | β = −0.500 | β = −1.000 |
|---|---|---|---|
| D0 | ∞ | 245.476 | 142.932 |
| d 6 | 22.533 | 19.840 | 17.231 |
| d11 | 3.240 | 30.172 | 56.264 |
| B f | 43.929 | 43.929 | 43.929 |

TABLE 3
(Third Embodiment)

FN = 2.87    Angle of view 2ω = 23.3°

|   | r | d | ν | n |
|---|---|---|---|---|
| 1 | 70.486 | 4.50 | 53.7 | 1.69350 |
| 2 | 2221.907 | 1.30 | | |
| 3 | 33.524 | 5.80 | 48.1 | 1.71700 |
| 4 | 76.681 | 1.90 | | |
| 5 | 117.284 | 1.90 | 32.2 | 1.67270 |
| 6 | 25.133 | (variable) | | |
| 7 | −23.083 | 1.70 | 35.7 | 1.62588 |

TABLE 3-continued
(Third Embodiment)

|   | r | d | ν | n |
|---|---|---|---|---|
| 8 | 8541.371 | 6.30 | 53.7 | 1.69350 |
| 9 | −33.092 | 0.20 | | |
| 10 | 435.859 | 4.00 | 53.7 | 1.69350 |
| 11 | −51.561 | (variable) | | |
| 12 | −418.453 | 3.60 | 25.5 | 1.80458 |
| 13 | −62.218 | 6.10 | | |
| 14 | −46.492 | 1.50 | 39.6 | 1.80454 |
| 15 | 52.110 | 10.05 | | |
| 16 | 55.591 | 5.30 | 60.3 | 1.51835 |
| 17 | −167.064 | (B f) | | |

| | f = 105.000 | β = −0.500 | β = −1.000 |
|---|---|---|---|
| D0 | ∞ | 242.658 | 141.448 |
| d 6 | 22.671 | 18.729 | 14.954 |
| d11 | 3.594 | 29.877 | 55.044 |
| B f | 45.395 | 45.395 | 45.395 |

TABLE 4
(Fourth Embodiment)

FN = 2.86    Angle of view 2ω = 23.3°

|   | r | d | ν | n |
|---|---|---|---|---|
| 1 | 65.607 | 4.20 | 53.7 | 1.69350 |
| 2 | 1951.745 | 1.20 | | |
| 3 | 31.997 | 5.40 | 48.1 | 1.71700 |
| 4 | 71.740 | 1.80 | | |
| 5 | 109.165 | 1.80 | 32.2 | 1.67270 |
| 6 | 24.014 | (variable) | | |
| 7 | −24.949 | 1.80 | 35.7 | 1.62588 |
| 8 | 2403.000 | 6.60 | 53.7 | 1.69350 |
| 9 | −36.512 | 0.20 | | |
| 10 | 520.015 | 4.20 | 53.7 | 1.69350 |
| 11 | −51.522 | (variable) | | |
| 12 | −418.453 | 3.60 | 25.5 | 1.80458 |
| 13 | −62.218 | 6.10 | | |
| 14 | −46.492 | 1.50 | 39.6 | 1.80454 |
| 15 | 52.110 | 10.05 | | |
| 16 | 55.591 | 5.30 | 64.1 | 1.51680 |
| 17 | −157.000 | (B f) | | |

| | f = 105.000 | β = −0.500 | β = −1.000 |
|---|---|---|---|
| D0 | ∞ | 244.465 | 142.067 |
| d 6 | 23.090 | 19.993 | 17.790 |
| d11 | 3.430 | 30.365 | 56.433 |
| B f | 43.929 | 43.929 | 43.929 |

TABLE 5
(Fifth Embodiment)

$F_{NO}$ = 2.86    Angle of view 2ω = 23.3°

|   | r | d | ν | n |
|---|---|---|---|---|
| 1 | 65.543 | 4.20 | 53.7 | 1.69350 |
| 2 | 2391.236 | 1.20 | | |
| 3 | 32.311 | 5.40 | 48.1 | 1.71700 |
| 4 | 71.416 | 1.80 | | |
| 5 | 109.137 | 1.80 | 32.2 | 1.67270 |
| 6 | 24.231 | (variable) | | |
| 7 | −24.186 | 1.80 | 35.7 | 1.62588 |
| 8 | ∞ | 6.60 | 53.7 | 1.69350 |
| 9 | −34.964 | 0.20 | | |
| 10 | 720.029 | 4.20 | 53.7 | 1.69350 |
| 11 | −51.038 | (variable) | | |
| 12 | −406.620 | 3.60 | 25.5 | 1.80458 |
| 13 | −62.284 | 6.10 | | |
| 14 | −46.683 | 1.50 | 39.6 | 1.80454 |
| 15 | 52.190 | (variable) | | |
| 16 | 56.017 | 5.30 | 64.1 | 1.51680 |
| 17 | −153.690 | (B f) | | |

| | f = 105.000 | β 32 −0.500 | β = −1.000 |
|---|---|---|---|
| D0 | ∞ | 240.890 | 141.864 |
| d 6 | 22.982 | 19.805 | 17.682 |
| d11 | 3.807 | 31.432 | 56.809 |
| d15 | 10.000 | 7.238 | 10.000 |
| B f | 43.966 | 43.966 | 43.966 |

TABLE 6

| Embodi-ment | (Values Corresponding to Conditions) | | | | | | | |
|---|---|---|---|---|---|---|---|---|
| | $\Delta s_2/\Delta s_1$ | $f_{12}/f$ | $f_1/f_{12}$ | $f_1/f_2$ | q | P | $f_{3F}/f_3$ | $f_3'/f_3$ |
| 1 | 1.053 | 0.801 | 2.188 | 2.142 | −0.805 | 0.782 | | |
| 2 | 1.111 | 0.714 | 2.148 | 2.088 | −0.858 | 0.837 | | |
| 3 | 1.176 | 0.706 | 2.378 | 2.398 | −0.788 | 0.807 | | |
| 4 | 1.111~1.130 | 0.714 | 2.188 | 2.142 | −0.820 | 0.837 | | |
| 5 | 1.111~1.147 | 0.714 | 2.188 | 2.142 | −0.868 | 0.823 | 0.266 | 0.885 | where $P = f_3(\phi_A + \phi_B)$.

A stop S is provided at a distance of 5.2 from the object side surface (the seventh surface) of the negative lens L4 positioned most adjacent to the object side of the second lens group G2 in the first embodiment shown in FIG. 2 and having its concave surface of sharp curvature facing the object side, and is provided at a distance of 5.5 from the object side surface (the seventh surface) of the negative lens L4 positioned most adjacent to the object side of the second lens group G2 in each of the second to fifth embodiments and having its concave surface of sharp curvature facing the object side. The stop in each embodiment is moved with the second lens group during the focusing from infinity to a close distance.

The lenses according to the present invention are all of a construction in which the amount of movement during short distance focusing is small and a compact shape is maintained, and yet various aberrations are corrected very well over a range from infinity to a close distance and an excellent imaging performance is maintained.

I claim:

1. A lens system capable of close-up photographing comprising, in succession from the object side, a first lens group having a positive refractive power, a second lens group having a positive refractive power, and a third lens group having a negative refractive power, said first lens group and said second lens group being moved relative to each other for focusing from infinity to a close distance so that the spacing between said first lens group and said second lens group is reduced and the spacing between said second lens group and said third lens group is enlarged, said first and second lens groups being designed to satisfy the following condition:

$$1.0 < \Delta S_2/\Delta S_1 < 1.4,$$

where $\Delta S_1$: the amount of movement of said first lens group from the infinity photographing condition to a state in which an object at any distance is photographed.

$\Delta S_2$: the amount of movement of said second lens group from the infinity photographing condition to a state in which an object at any distance is photographed.

2. A lens system according to claim 1, wherein said first lens group and said second lens group are designed to satisfy the following condition:

$$0.7 < f_{12}/f < 1.0,$$

where f is the focal length of the entire system in the infinity photographing condition, and $f_{12}$ is the combined focal length of said first lens group and said second lens group in the infinity photographing condition.

3. A lens system according to claim 1, wherein said first lens group and said second lens group are designed to satisfy the following conditions:

$$1.8 < f_1/f_{12} < 2.6, \ 1.7 < f_1/f_2 < 2.7,$$

where $f_{12}$ is the combined focal length of said first lens group and said second lens group in the infinity photographing condition, $f_1$ is the focal length of said first lens group, and $f_2$ is the focal length of said second lens group.

4. A lens system according to claim 1, wherein said first lens group and said second lens group are moved toward the object side for focusing, and said third lens group remains fixed during the movement of said first and second lens groups.

5. A lens system according to claim 1, wherein said first lens group is moved toward the object side for focusing, said second lens group is moved non-linearly toward the object side for focusing relative to the movement of said first lens group, and said third lens group remains fixed during the movement of said first and second lens groups.

6. A lens system according to claim 1, wherein said third lens group comprises a forward group having a negative refractive power and a rearward group having a positive refractive power, said first lens group is moved toward the object side for focusing, said second lens group is moved non-linearly toward the object side for focusing relative to the movement of said first lens group, and the forward group of said third lens group is designed to be moved non-linearly toward the image side so as to depict convexity relative to the movement of said first lens group to correct the fluctuation of aberrations in conformity with the movement of said first and second lens groups.

7. A lens system according to claim 1, wherein in succession from the object side, said first lens group includes a positive first lens having its surface of sharper curvature facing the object side, a positive meniscus second lens having its convex surface facing the object side and a negative meniscus third lens having its concave surface facing the image side, said second lens group includes a negative fourth lens having its concave surface of sharp curvature facing the object side, a positive fifth lens joined to said negative fourth lens and a positive sixth lens having its surface of sharper curvature facing the image side, and said third lens group includes a positive meniscus seventh lens having its convex surface facing the image side, a negative eighth lens and a positive ninth lens having its surface of sharper curvature facing the object side.

8. A lens system according to claim 7, wherein said second lens group includes a stop member provided between said negative fourth lens and said first lens group, said stop member being designed to be moved with said negative fourth lens.

9. A lens system according to claim 7, wherein said positive sixth lens in said second lens group, said positive meniscus seventh lens and said negative eighth lens in said third lens group are designed to satisfy the following conditions:

$$-1 < q < -0.7, \ 0.7 < f_3(\phi A + \phi B) < 0.9,$$

where $f_3$: the focal length of said third lens group.

q: the shape factor of said positive sixth lens in said second lens group having its surface of sharper curvature facing the image side.

$$q = (rb + ra)/(rb - ra)$$

ra: the radius of curvature in the object side surface of said positive sixth lens in said second lens group.

rb: the radius of curvature in the image side surface of said positive sixth lens in said second lens group.

$\phi A$: the surface refractive power in the image side surface of said positive seventh lens in said third lens group.

$$\phi A = (1 - nc)/rc$$

nc: the refractive index of said positive seventh lens in said third lens group.

rc: the radius of curvature in the image side surface of said positive seventh lens in said third lens group.

$\phi B$: the surface refractive power in the image side surface of said negative eighth lens in said third lens group.

$$\phi B = (nd - 1)/rd$$

nd: the refractive index of said negative eighth lens in said third lens group.

rd: the radius of curvature in the object side surface of said negative eighth lens in said third lens group.

10. A lens system according to claim 7, wherein said third lens group is divided into a forward group comprising said positive sixth lens and said negative seventh lens and having a negative combined refractive power and a rearward group comprising said positive eighth lens, said first lens group is moved toward the object side for focusing, said second lens group is moved non-linearly toward the object side for focusing relative to the movement of said first lens group, and said forward group of said third lens group is designed to be moved non-linearly toward the image side so as to depict convexity relative to the movement of said first lens group to correct the fluctuations of aberrations in conformity with the movement of said first lens group and said second lens group.

11. A lens system according to claim 10, wherein said forward group of said third lens group is designed to satisfy the following conditions:

$$0.2 < f_3F/f_3 < 0.3, \; 0.8 < f_3'/f_3 < 1.3,$$

where $f_3$ is the focal length of said third lens group, $f_3F$ is the focal length of said forward group of said third lens group, and $f_3'$ is the focal length of said third lens group when said forward group of said third lens group is moved at a maximum by the close distance photographing.

12. A lens system according to claim 1, designed in accordance with the data shown in the following table:

| | FN = 2.86 | Angle of view 2ω = 23.1° | | |
|---|---|---|---|---|
| | r | d | v | n |
| 1 | 89.135 | 4.30 | 55.6 | 1.69680 |
| 2 | −825.458 | 0.20 | | |
| 3 | 34.325 | 6.00 | 55.6 | 1.69680 |
| 4 | 84.778 | 2.00 | | |
| 5 | 177.749 | 2.00 | 35.7 | 1.62588 |
| 6 | 26.811 | (variable) | | |
| 7 | −30.223 | 2.00 | 33.7 | 1.64831 |
| 8 | −2217.934 | 7.50 | 53.7 | 1.69350 |
| 9 | −38.620 | 0.20 | | |
| 10 | 637.422 | 4.30 | 50.2 | 1.72000 |
| 11 | −68.917 | (variable) | | |
| 12 | −91.534 | 3.50 | 25.5 | 1.80458 |
| 13 | −57.798 | 13.03 | | |
| 14 | −43.991 | 2.00 | 40.9 | 1.79631 |
| 15 | 79.429 | 1.50 | | |
| 16 | 80.085 | 4.50 | 49.5 | 1.74443 |
| 17 | −111.511 | (B F) | | |

| | F = 105.000 | β = −0.500 | β = −1.000 |
|---|---|---|---|
| D0 | ∞ | 246.632 | 143.209 |
| d 6 | 29.603 | 27.918 | 26.262 |
| d11 | 3.331 | 37.033 | 70.146 |
| B f | 42.154 | 42.154 | 42.154 | wherein the numbers in the left column represent lens surfaces in order from the object side, r represents the radius of curvature of each lens surface, d represents the spacing between adjacent lens surfaces, v represents the Abbe number (for d-line), n represents the refractive index (for d-line), FN represents the F-number, f represents the focal length of the entire system, β represents the photographing magnification, D0 represents the distance to the object from the vertex of the object side surface of the lens closest to the object, and Bf represents the back focal length to the focal plane.

13. A lens system according to claim 1, designed in accordance with the data shown in the following table:

| | FN = 2.86 | Angle of view 2ω = 23.3° | | |
|---|---|---|---|---|
| | r | d | v | n |
| 1 | 64.416 | 4.20 | 53.7 | 1.69350 |
| 2 | 2294.143 | 1.20 | | |
| 3 | 31.593 | 5.40 | 48.1 | 1.71700 |
| 4 | 69.640 | 1.80 | | |
| 5 | 107.780 | 1.80 | 32.2 | 1.67270 |
| 6 | 23.700 | (variable) | | |
| 7 | −24.934 | 1.80 | 35.7 | 1.62588 |
| 8 | 3962.000 | 6.60 | 53.7 | 1.69350 |
| 9 | −36.905 | 0.20 | | |
| 10 | 656.083 | 4.20 | 53.7 | 1.69350 |
| 11 | −50.026 | (variable) | | |
| 12 | −418.453 | 3.60 | 25.5 | 1.80458 |
| 13 | −62.218 | 6.10 | | |
| 14 | −46.492 | 1.50 | 39.6 | 1.80454 |
| 15 | 52.110 | 10.05 | | |
| 16 | 55.591 | 5.30 | 64.1 | 1.51680 |
| 17 | −157.000 | (B f) | | |

| | f = 104.999 | β = −0.500 | β = −1.000 |
|---|---|---|---|
| D0 | ∞ | 245.476 | 142.932 |
| d 6 | 22.533 | 19.840 | 17.231 |
| d11 | 3.240 | 30.172 | 56.264 |
| B f | 43.929 | 43.929 | 43.929 | wherein the numbers in the left column represent lens surfaces in order from the object side, r represents the radius of curvature of each lens surface, d represents the spacing between adjacent lens surfaces, v represents the Abbe number (for d-line), n represents the refractive index (for d-line), FN represents the F-number, f represents the focal length of the entire system, β represents the photographing magnification, D0 represents the distance to the object from the vertex of the object side surface of the lens closest to the object, and Bf represents the back focal length to the focal plane.

14. A lens system according to claim 1, designed in accordance with the data shown in the following table:

| | FN = 2.87 | Angle of view 2ω = 23.3° | | |
|---|---|---|---|---|
| | r | d | ν | n |
| 1 | 70.486 | 4.50 | 53.7 | 1.69350 |
| 2 | 2221.907 | 1.30 | | |
| 3 | 33.524 | 5.80 | 48.1 | 1.71700 |
| 4 | 76.681 | 1.90 | | |
| 5 | 117.284 | 1.90 | 32.2 | 1.67270 |
| 6 | 25.133 | (variable) | | |
| 7 | −23.083 | 1.70 | 35.7 | 1.62588 |
| 8 | 8541.371 | 6.30 | 53.7 | 1.69350 |
| 9 | −33.092 | 0.20 | | |
| 10 | 435.859 | 4.00 | 53.7 | 1.69350 |
| 11 | −51.561 | (variable) | | |
| 12 | −418.453 | 3.60 | 25.5 | 1.80458 |
| 13 | −62.218 | 6.10 | | |
| 14 | −46.492 | 1.50 | 39.6 | 1.80454 |
| 15 | 52.110 | 10.05 | | |
| 16 | 55.591 | 5.30 | 60.3 | 1.51835 |
| 17 | −167.064 | (B f) | | |

| | f = 105.000 | β = −0.500 | β = −1.000 |
|---|---|---|---|
| D0 | ∞ | 242.658 | 141.448 |
| d 6 | 22.671 | 18.729 | 14.954 |
| d11 | 3.594 | 29.877 | 55.044 |
| B f | 45.395 | 45.395 | 45.395 | wherein the numbers in the left column represent lens surfaces in order from the object side, r represents the radius of curvature of each lens surface, d represents the spacing between adjacent lens surfaces, ν represents the Abbe number (for d-line), n represents the refractive index (for d-line), FN represents the F-number, f represents the focal length of the entire system, β represents the photographing magnification, D0 represents the distance to the object from the vertex of the object side surface of the lens closest to the object, and Bf represents the back focal length to the focal plane.

15. A lens system according to claim 1, designed in accordance with the data shown in the following table:

| | FN = 2.86 | Angle of view 2ω = 23.3° | | |
|---|---|---|---|---|
| | r | d | ν | n |
| 1 | 65.607 | 4.20 | 53.7 | 1.69350 |
| 2 | 1951.745 | 1.20 | | |
| 3 | 31.997 | 5.40 | 48.1 | 1.71700 |
| 4 | 71.740 | 1.80 | | |
| 5 | 109.165 | 1.80 | 32.2 | 1.67270 |
| 6 | 24.014 | (variable) | | |
| 7 | −24.949 | 1.80 | 35.7 | 1.62588 |
| 8 | 2403.000 | 6.60 | 53.7 | 1.69350 |
| 9 | −36.512 | 0.20 | | |
| 10 | 520.015 | 4.20 | 53.7 | 1.69350 |
| 11 | −51.522 | (variable) | | |
| 12 | −418.453 | 3.60 | 25.5 | 1.80458 |
| 13 | −62.218 | 6.10 | | |
| 14 | −46.492 | 1.50 | 39.6 | 1.80454 |
| 15 | 52.110 | 10.05 | | |
| 16 | 55.591 | 5.30 | 64.1 | 1.51680 |
| 17 | −157.000 | (B f) | | |

| | f = 105.000 | β = −0.500 | β = −1.000 |
|---|---|---|---|
| D0 | ∞ | 244.465 | 142.067 |
| d 6 | 23.090 | 19.993 | 17.790 |
| d11 | 3.430 | 30.365 | 56.433 |
| B f | 43.929 | 43.929 | 43.929 | wherein the numbers in the left column represent lens surfaces in order from the object side, r represents the radius of curvature of each lens surface, d represents the spacing between adjacent lens surfaces, ν represents the Abbe number (for d-line), n represents the refractive index (for d-line), FN represents the F-number, f represents the focal length of the entire system, β represents the photographing magnification, D0 represents the distance to the object from the vertex of the object side surface of the lens closest to the object, and Bf represents the back focal length to the focal plane.

16. A lens system according to claim 1, designed in accordance with the data shown in the following table:

| | $F_{NO}$ = 2.86 | Angle of view 2ω = 23.3° | | |
|---|---|---|---|---|
| | r | d | ν | n |
| 1 | 65.543 | 4.20 | 53.7 | 1.69350 |
| 2 | 2391.236 | 1.20 | | |
| 3 | 32.311 | 5.40 | 48.1 | 1.71700 |
| 4 | 71.416 | 1.80 | | |
| 5 | 109.137 | 1.80 | 32.2 | 1.67270 |
| 6 | 24.231 | (variable) | | |
| 7 | −24.186 | 1.80 | 35.7 | 1.62588 |
| 8 | ∞ | 6.60 | 53.7 | 1.69350 |
| 9 | −34.964 | 0.20 | | |
| 10 | 720.029 | 4.20 | 53.7 | 1.69350 |
| 11 | −51.038 | (variable) | | |
| 12 | −406.620 | 3.60 | 25.5 | 1.80458 |
| 13 | −62.284 | 6.10 | | |
| 14 | −46.683 | 1.50 | 39.6 | 1.80454 |
| 15 | 52.190 | (variable) | | |
| 16 | 56.017 | 5.30 | 64.1 | 1.51680 |
| 17 | −153.690 | (B f) | | |

| | f = 105.000 | β = −0.500 | β = −1.000 |
|---|---|---|---|
| D0 | ∞ | 240.890 | 141.864 |
| d 6 | 22.982 | 19.805 | 17.682 |
| d11 | 3.807 | 31.432 | 56.809 |
| d15 | 10.000 | 7.238 | 10.000 |
| B f | 43.966 | 43.966 | 43.966 | wherein the numbers in the left column represent lens surfaces in order from the object side, r represents the radius of curvature of each lens surface, d represents the spacing between adjacent lens surfaces, ν represents the Abbe number (for d-line), n represents the refractive index (for d-line), FN represents the F-number, f represents the focal length of the entire system, β represents the photographing magnification, D0 represents the distance from the vertex of the object side surface of the lens closest to the object, and Bf represents the back focal length to the focal plane.

* * * * *